Jan. 16, 1940.    R. W. JOHNSON    2,187,321
SNAP FASTENER MEMBER
Filed Nov. 17, 1938

Inventor:
Russell W. Johnson.
by Walter P. Jones
Att'y.

Patented Jan. 16, 1940

2,187,321

UNITED STATES PATENT OFFICE 2,187,321

SNAP FASTENER MEMBER

Russell W. Johnson, Detroit, Mich., assignor to United-Carr Fastener Corporation, Cambridge, Mass., a corporation of Massachusetts Application November 17, 1938, Serial No. 241,005

1 Claim. (Cl. 24—73)

This invention relates to improvements in snap fasteners.

The chief object of my invention is directed to the improved construction of the U-shaped base of a snap fastener of the so-called "hook-on" type having snap-acting attaching means extending from the upper arm of the base. In my improved construction, portions of the upper arm have a greater lateral dimension than the lower arm of the base so as to prevent tipping of the fastener into an opening of a supporting panel with which the fastener is assembled in certain positions of the fastener as a result of pressure applied to the snap-acting attaching means in the direction of the upper arm.

Referring to the drawing, in which I have illustrated a preferred embodiment of my invention:

Figure 6:
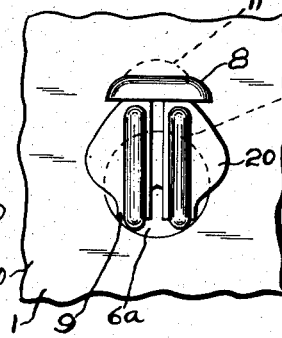
Figure 7:
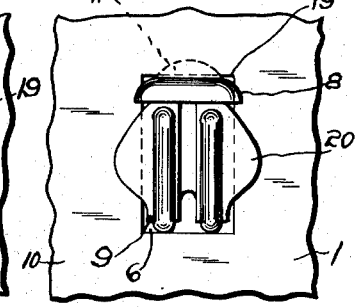

Fig. 6 is a top plan view of my improved fastener member assembled with an upholstery panel having a circular aperture and showing a position which may be taken by the fastener member relative to the panel; and Fig. 7 is a top plan view of one of my improved fastener members secured to an upholstery panel having an elongated aperture and showing a position which may be taken by my fastener member relative to the panel.

Figure 1:
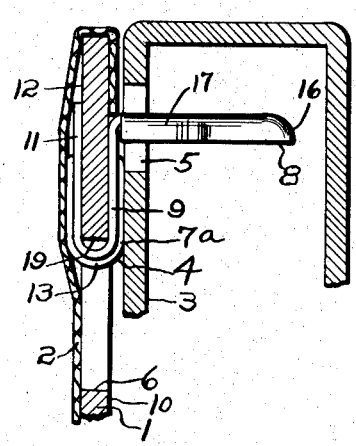
Fig. 1 is a sectional view of a preferred installation of my invention showing the manner in which an upholstery panel may be secured to a support by means of one of my improved fastener members shown in side elevation.
Figure 2:
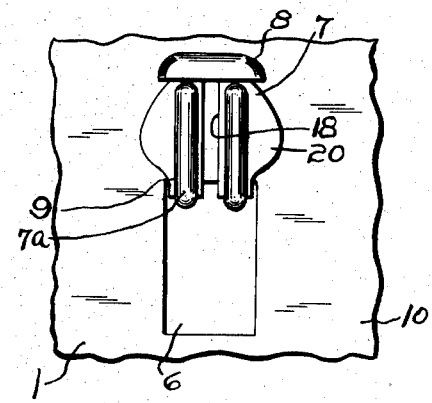
Fig. 2 is a top plan view showing the manner by which my improved fastener member is assembled with an upholstery panel.

Referring to Figs. 1, 2, 6 and 7, in which I have illustrated a preferred use of my invention, I have shown an upholstery panel including a backing 1 of cardboard or the like material covered on its exposed surface by flexible material 2, such as cloth or the like. The upholstery panel is secured to a support 3 (Fig. 1), which may be the frame of a door of an automobile, by a snap fastener member 4 having a base portion in fastened engagement with the upholstery panel and a stud portion in snap fastener engagement with the support through an aperture 5 thereof. The cardboard panel 1 may have a rectangular aperture 6, as shown in Figs. 2 and 7, for receiving a portion of the fastener base for securing the base to the panel, or a circular aperture 6a, as shown in Fig. 6.

Although I have preferably illustrated the use of my improved fastener members with trim panel installations, I do not wish to be limited thereby as my fastener members are capable of satisfactory operation with other installations than the one specifically illustrated and described.

Figure 3:
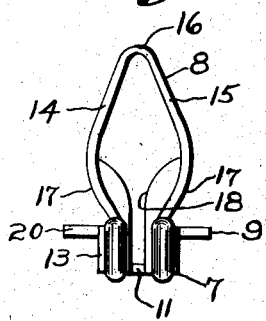
Fig. 3 is a rear view of my fastener member per se.
Figure 4:
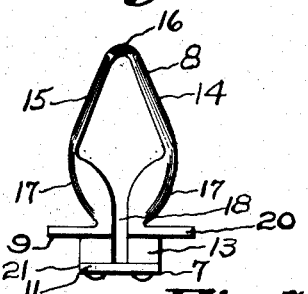
Fig. 4 is a front view of my fastener member per se.

Referring in detail to my improved fastener member, I have shown one which, in my preferred form, is made entirely from one piece of metal. My preferred form of fastener member is broadly similar to one with which I am familiar and which is illustrated and described in connection with United States co-pending application, Serial No. 207,540, filed May 12, 1938. My fastener is directed to certain improvements over the fasteners of the above-mentioned application, as will be hereinafter set out. The fastener member has a base portion 7 and an attaching means in the form of a snap-acting stud means 8 extending in angular relation to the base portion. The base portion 7, in my preferred form, is of the U-shaped "hook-on" type and has an upper arm 9 for engaging an upper surface 10 of the panel 1 and a lower arm 11 engaging a lower surface 12 (Fig. 1) of the panel 1 through a rectangular aperture 6 or circular aperture 6a therein. Ribs 7a may be formed in the base 7 for strengthening purposes, as will be understood by those skilled in the art. The upper arm 9 is in superimposed spaced relation to the lower arm 11 and connected to the lower arm by a bight 13. The stud means 8 extends from adjacent an end of the upper arm 9 opposed to the bight 13 in substantially perpendicular relation to the base portion, as most clearly shown in Fig. 1. The stud means 8 has a pair of yieldable socket-engaging portions 14 and 15 (Figs. 3 and 4) which are joined together at their ends opposed to the base portion 7 forming a nose 16. Outer sides of the socket-engaging portions 14 and 15 diverge from the nose 16 and then converge toward the arm 9 providing shoulders 17—17 for snap fastener engagement behind an opposite surface of a portion of the support 3 from that opposite which the upholstery panel is disposed. An opening 18 is provided in my fastener member adjacent the socket-engaging portions 14 and 15 and extends from the nose 16 through the upper arm 9, the bight 13 and into the lower arm 11 of the base. The opening 18 serves to increase the yieldability of the socket-engaging portions 14 and 15 so as to enable them to move toward and away from each other in direct opposite relation during engagement thereof with the support 3 through the aperture 5.

Figure 5:
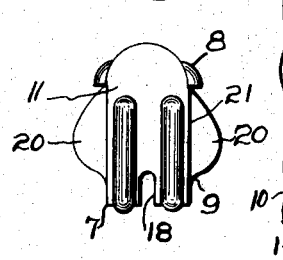
Fig. 5 is a bottom view of my fastener member per se.

The fastener member is preferably applied to the trim panel after the covering 2 is applied to the panel 1 and from the rear side of the panel by inserting the lower arm 11 through an aperture 6 or 6a and forcing the base into place so that the fastener assumes a position as shown in Fig. 1 with the lower arm 11 engaging one surface of the support and the upper arm 9 engaging an opposite surface of the support. Heretofore fastener members have been used which provide a U-shaped base of the "hook-on" type secured to a panel in the manner of the fastener member which is the subject of the present application. In the constructions of the U-shaped bases of the fastener members heretofore known, however, the lateral dimensions of the upper arm are substantially the same as the lateral dimensions of the lower arm. As a result, during attachment of the trim panel to the support, if the snap-acting attaching means of the fastener is not in exact alignment with the cooperating aperture of the part to which the panel is to be attached, the attaching means may be caused to jam with the wall of the aperture of the last-mentioned part whereby the fastener is moved from normal fastened position with the bight thereof substantially adjacent an edge 19 of the opening of the trim panel (Fig. 1) to a position in which the bight is substantially spaced from the edge of the panel opening (Figs. 6 and 7). At the same time, when the fastener is in said last-mentioned displaced position, there is a tendency for the upper arm of the U-shaped base to tip backwardly into the opening of the trim panel as a result of the pressure upon the attaching means thereby causing an unattractive bulge in the outer side of the cloth covering the panel. The improved feature of the fastener member, which is the subject of this present application, over fastener members heretofore known in the art results from modifications in the construction of the upper arm 9, which limits any chance of movement of the upper arm into the opening of the cardboard panel 1 even though the bight of the fastener base has taken an unnatural or displaced position, as shown in Figs. 6 and 7. As a means for carrying out my desired object, wing portions 20 are provided adjacent the side edges of the upper arm 9 between the attaching means 8 and the bight 13 which extend laterally beyond the side edges 21 of the lower arm 11, as most clearly shown in Figs. 4 and 5. Thus, as may be clearly seen from inspection of Figs. 6 and 7, when the bight of the fastener base has been removed from normal fastened position substantially adjacent the edge 19 of the opening, the wing portions 20 provide a relatively wide bearing surface superposed above the inner surface 10 of the panel 1 adjacent the aperture 6 or 6a, depending upon the shape of aperture preferred, so as to prevent tipping of the upper arm 9 into the opening of the panel.

Thus it will be seen that as a result of the modified construction of the base member of the fastener, I have effected a fastener member capable of more efficient and satisfactory performance over those heretofore known in the art.

Although I have illustrated and described a preferred embodiment of my invention, I do not wish to be limited thereby because the scope of my invention is best defined in the following claim.

I claim:

A snap fastener member having a U-shaped attaching portion comprising an upper arm for engaging an upper surface of a support, a lower arm in spaced substantially parallel relation to said upper arm for engaging a lower surface of said support through an opening of said support, a bight connecting said arms at their ends, snap-acting stud means at the end of said upper arm opposed to said bight and extending in angular relation to said upper arm, and the side edges of said upper arm diverging from adjacent said stud means directly away therefrom and laterally beyond the side edges of said lower arm and then converging to said bight thereby to provide overlapping portions to limit tipping movement of said upper arm into said opening of said support when said upper arm is in certain positions relative to the opening and pressure is applied to said snap-acting stud means in a direction toward said upper arm.

RUSSELL W. JOHNSON.